April 13, 1954   A. F. HICKMAN   2,675,226
SPRING SUSPENSION FOR VEHICLES
Original Filed May 8, 1947   4 Sheets-Sheet 1
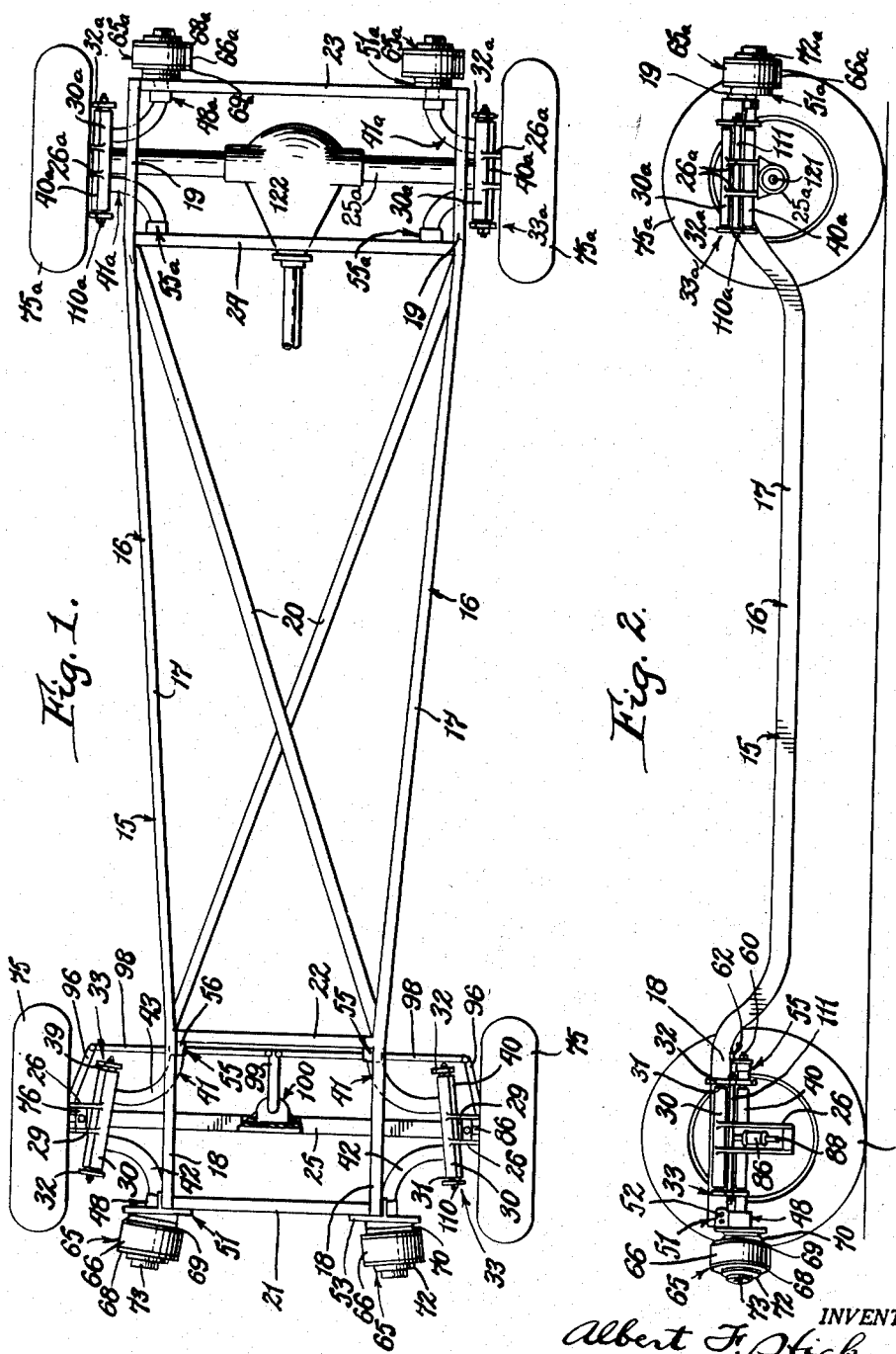
INVENTOR.
Albert F. Hickman
BY
Popp and Sommer
ATTORNEYS.

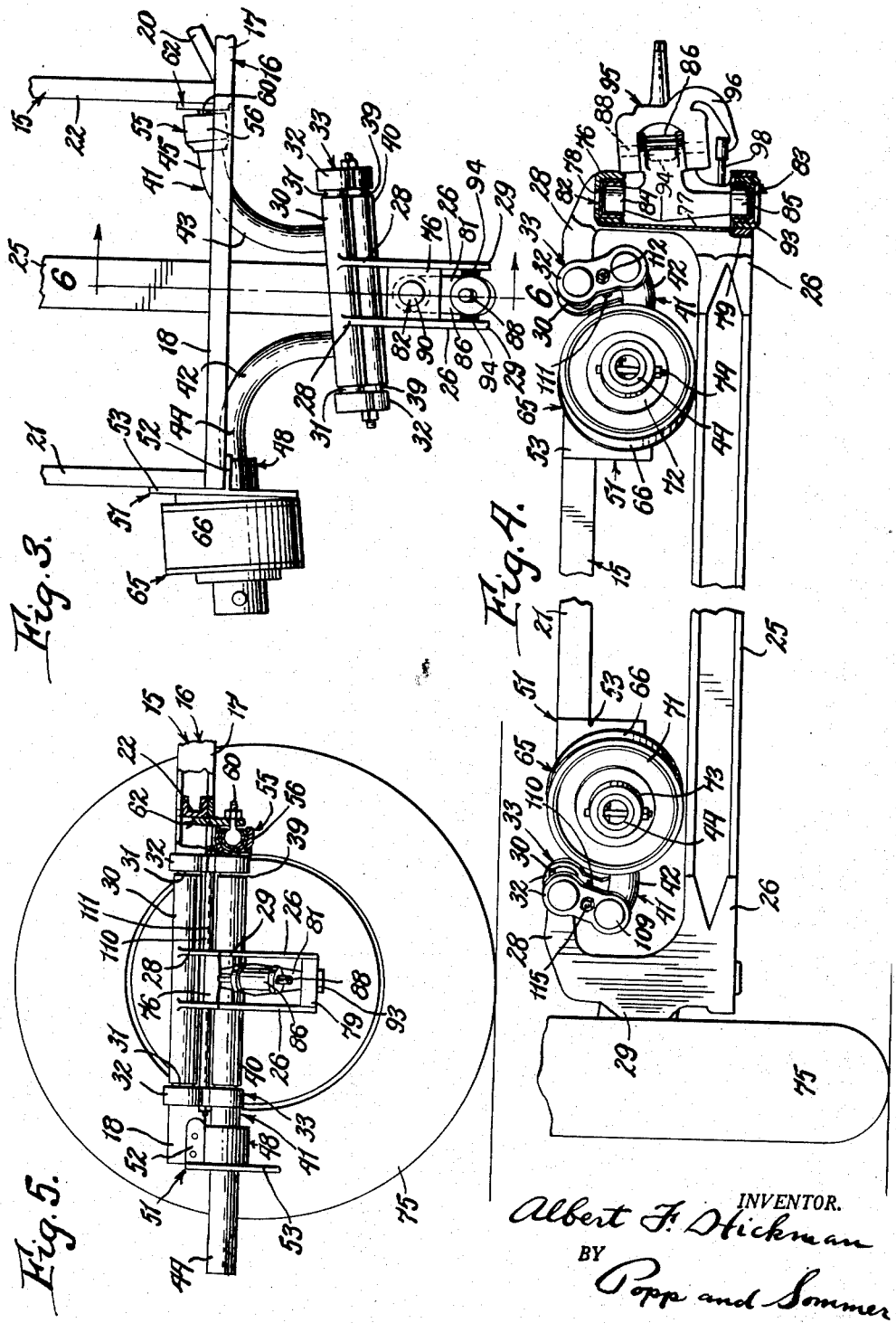

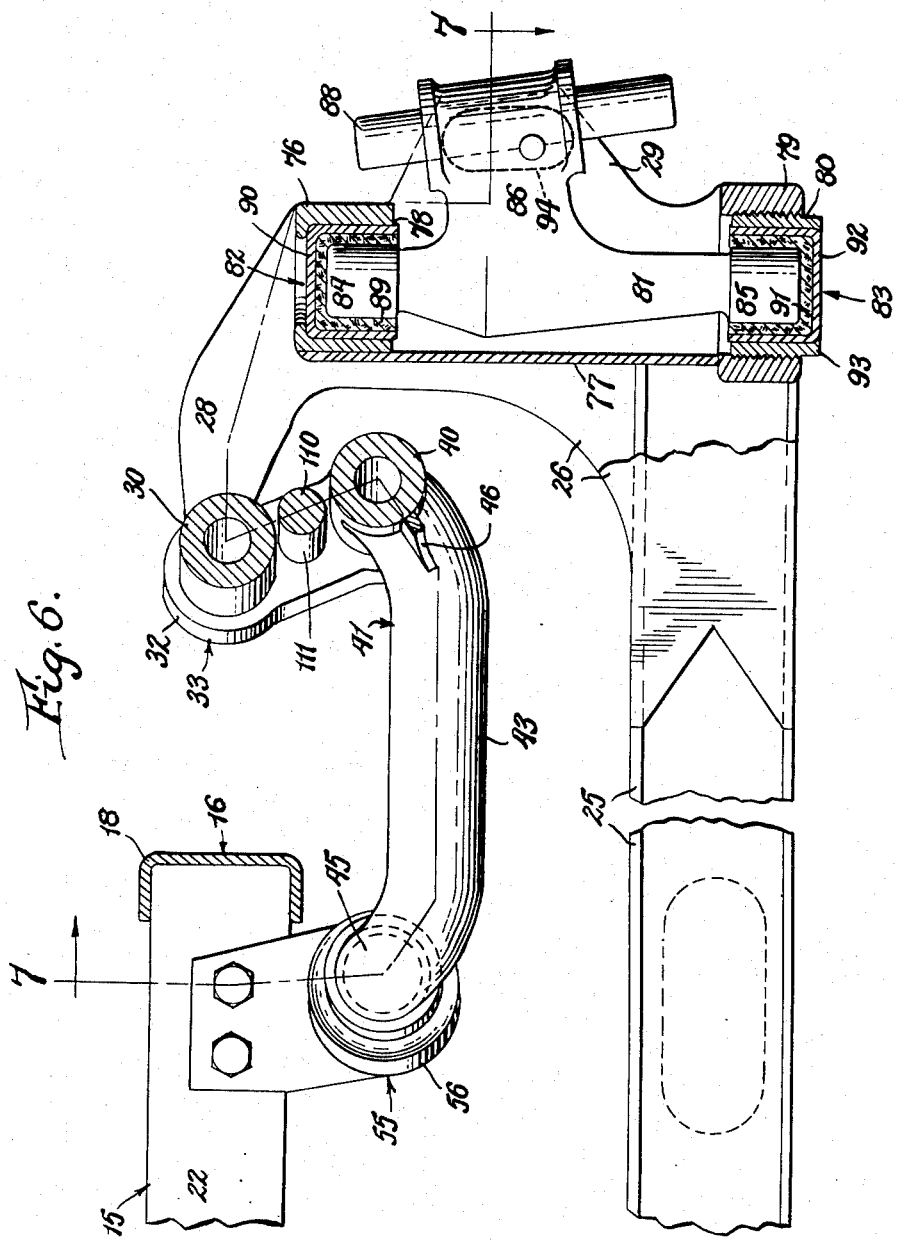

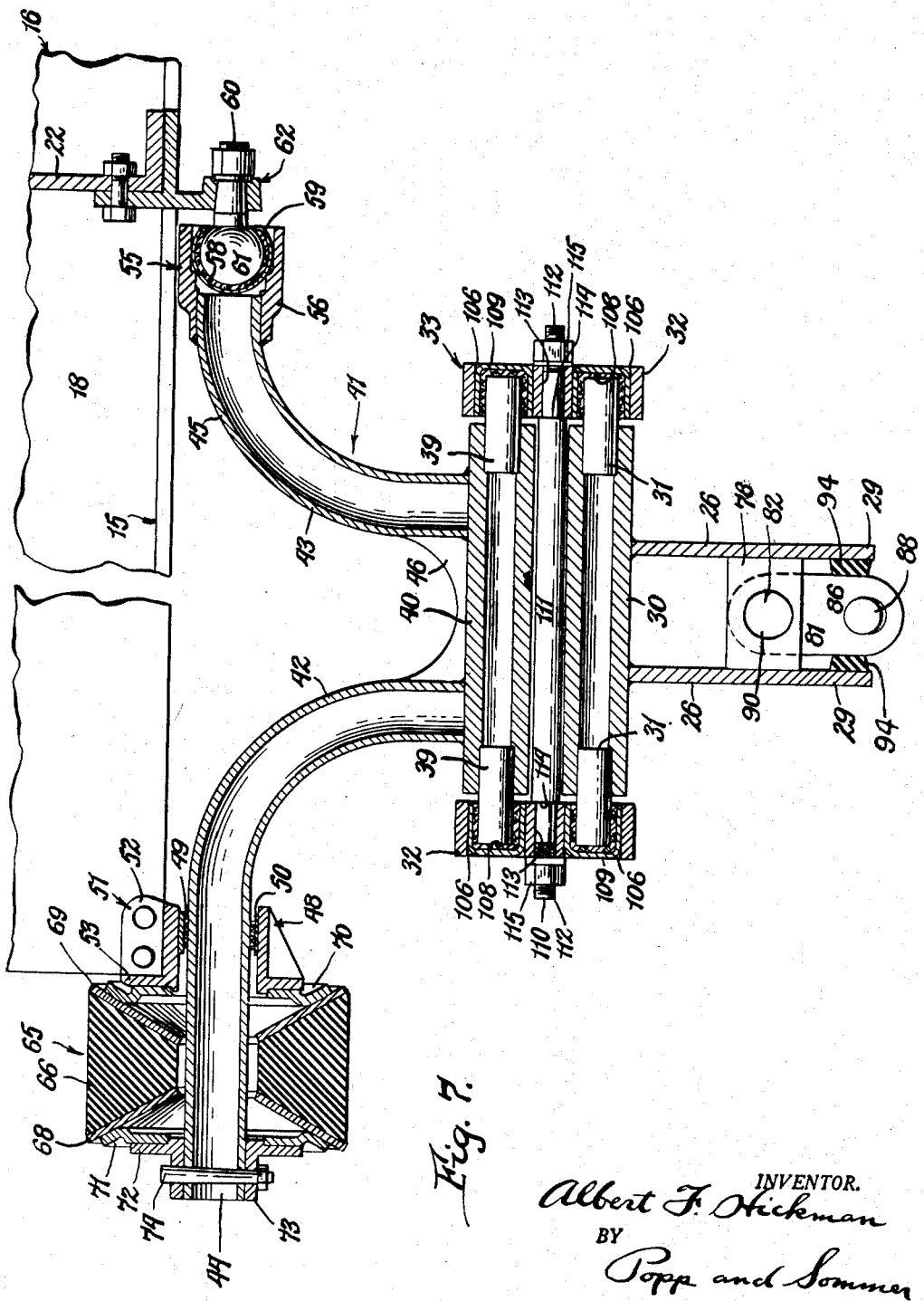

Patented Apr. 13, 1954

2,675,226

UNITED STATES PATENT OFFICE 2,675,226

SPRING SUSPENSION FOR VEHICLES

Albert F. Hickman, Eden, N. Y., assignor to Hickman Industries, Inc., Eden, N. Y., a corporation of New York Original application May 8, 1947, Serial No. 746,679, now Patent No. 2,577,760, dated December 11, 1951. Divided and this application September 5, 1951, Serial No. 245,175

4 Claims. (Cl. 267—57.1)

This invention relates to a spring suspension for vehicles and is shown as embodied in a torsional type of spring suspension between the axle assemblies and the vehicle frame, and in which the axles are permitted to move against a geometric resilient resistance, both laterally and vertically, relative to the vehicle frame. However, features of the invention are also applicable to the other types of spring suspensions, particularly as it relates to the front or steering axle assembly which is constructed so that the steering wheels are capable of resiliently restraining independent movement longitudinally of the vehicle frame, to compensate for the changes in wheel rotational speed in traveling over an undulating road, such movement being obtained without sacrifice of the steering geometry.

The present invention is a division of my copending application, Serial No. 746,679, filed May 8, 1947, for Spring Suspension for Vehicles, now Patent No. 2,577,760, dated December 11, 1951.

In common with my said copending application, important objects of the present invention are to provide a spring suspension (1) which will function to safely support the car body at high speeds, both when loaded and unloaded; (2) which reduces and cushions both the vertical and lateral impacts from the axles against the body of the vehicle, both when the vehicle is loaded and unloaded, and without imposing undue end thrusts on the pivotal connections which connect the axles to the body; (3) in which torsion springs are employed to provide a longer and variable spring resistance range; (4) in which geometric resilient resistance is obtained in a compact structure which requires no lubrication and is free from the squeaks incident to the use of leaf springs; (5) in which the distribution of the load to the body is at a plurality of spaced points; (6) in which the side sway is reduced to any desired amount; (7) in which periodic vibration of the suspension is dampened out and in which wheel tramp is avoided; (8) in which all forces are cushioned so as to increase gasoline mileage and decrease tire wear; (9) which has light unsprung weight; (10) in which the metal stresses are within safe working limits of heat treated forgings or castings; (11) which can be produced at low cost and in particular requires only simple machining operations; (12) in which the parts are arranged inside of the wheels and in which the parts are located close to the wheels to provide wide pivot positions and increased stability; (13) which can easily be taken down and repaired; (14) in which any desired frequency or degree of spring deflection can be obtained; (15) in which auxiliary devices for the control of side sway are rendered unnecessary; and (16) which is extremely compact and will stand up under conditions of severe and constant use with very little servicing.

One of the specific objects of the present invention is to provide a suspension in which the resilient support is provided by rubber torsion springs which are simple, compact and low in cost, and which will have long life and freedom from service difficulties.

Another specific object is to provide a suspension including such rubber torsion springs in which the rubber torsion springs have a simple mounting on the frame of the vehicle and have a simple and direct connection with the linkage connecting the axles with the frame.

Another specific object of the invention is to provide such a suspension which can be readily designed to have, within practicable limits, any desired frequency and any desired resistance curve.

Other specific objects and advantages of the invention will appear from the following description and drawings in which:

Fig. 1 is a fragmentary top plan view of the frame of a vehicle supported on front and rear axles by a torsion spring suspension embodying my invention.

Fig. 2 is a side elevation thereof, viewed from the left hand side of the vehicle, and showing the left hand wheels removed.

Fig. 3 is an enlarged fragmentary view similar to Fig. 1 and showing in particular the front left hand side of the steering axle assembly.

Fig. 4 is a front elevation thereof and showing parts at one end of the steering axle assembly broken away.

Fig. 5 is a fragmentary enlarged view similar to Fig. 2 and showing in particular the steering axle assembly.

Fig. 6 is a further enlarged sectional view taken generally on line 6—6, Fig. 3, and showing parts broken away.

Fig. 7 is an enlarged fragmentary laid out section of the axle bracket, shackle structure, crank arm, and rubber torsion spring connecting one end of the front steering axle with the frame of the vehicle, this section being taken generally on line 7—7, Fig. 6, and showing parts in elevation.

The main frame 15 of the vehicle can be of any suitable construction and is shown as comprising a pair of longitudinal horizontal side frame bars in the form of inwardly facing channels 16, the central parts 17 of which are shown as converging toward the front of the vehicle and as depressed, as best shown in Fig. 2, relative to the front and rear ends 18 and 19, respectively, thereof. The central parts 17 of these side frame bars of the frame are shown as connected by a pair of diagonal bars 20. A cross bar 21 is shown as connecting the extreme forward ends of the longitudinal side bars 16; a cross bar 22 is shown as connecting these longitudinal side bars at the rear ends of the parallel forward portions 18 thereof; a cross bar 23 is shown as connecting the extreme rearward ends of these longitudinal side frame bars; and a cross bar 24 is shown as connecting the forward ends of the rear parallel extremities 19 thereof.

The entire vehicle chassis, together with its spring suspension, is constructed substantially symmetrically about a vertical longitudinal medial plane, and hence it is deemed sufficient to confine the following detailed description to the one (left) side of the vehicle, it being understood that this description and the same reference numerals apply to the opposite (right) side of the vehicle.

The front end of the vehicle chassis or frame is supported on a front steering axle 25 which is shown as being in the form of an I-beam extending transversely of the frame 15 substantially centrally with reference to the front cross bars 21 and 22 of the vehicle frame. A pair of extensions in the form of plates 26, is shown as welded to each end of the front steering axle to the front and rear edges of the flanges thereof, these plates being of the same shape and extending outwardly from the ends of the axle in parallel spaced relation. These plates also extend upwardly from the ends of the axle and the extreme upper ends of these plates are formed to provide arms 28 which extend horizontally inward toward the vehicle frame 15 to provide a pair of axle brackets at each end of the axle 25. Each of the plates 26 is also formed to provide a horizontally outwardly projecting ear 29 for a purpose which will presently appear.

A tube 30 is welded to the inner extremities of the arms 28 of each pair of plates 26, as best shown in Figs. 6 and 7, these tubes 30 extending longitudinally of the vehicle in a horizontal plane but preferably being arranged in forwardly diverging relation to each other as best shown in Figs. 1 and 3. Each of the tubes 30, as best shown in Fig. 7, has a pair of axle pivot pins 31 which are secured therein and project from opposite ends thereof. The projecting ends of these axle pivot pins are secured by shackles 32 of a shackle structure indicated at 33 with similar crank arm pivot pins 39 secured to and projecting from opposite ends of a tube 40 forming the free end or outwardly offset portion of a crank arm indicated generally at 41. This tube 40 is disposed parallel with the tube 30, that is, it diverges forwardly in a horizontal plane.

This crank arm is shown as comprising a pair of tubes 42 and 43 each having one end welded to the tube 40 and each bent so that their opposite ends 44, 45 are arranged in oppositely directed coaxial relation to each other. To provide additional strength a small bracing plate 46 is shown as welded to the tube 40 intermediate the arms 42 and 43 and as extending along and welded to the opposing surfaces of these arms, as best shown in Fig. 7.

The front and rear ends 44 and 45 of each crank arm 41 are journaled on the main frame 15 of the vehicle to fulcrum about an axis extending parallel with the tubes 30 and 40, the fulcrum axis of these crank arms 41 thereby diverging toward the forward end of the vehicle. For this purpose the end 44 of the front tubular arm 42 of the crank arm 41 is shown as journaled in a bearing 48 secured to the extreme forward end of the corresponding longitudinal side frame bar 16 of the vehicle frame. This bearing 48, as best shown in Fig. 7, is preferably in the form of a bushing 49 of lubricant impregnated material encased in a metal sleeve 50, this sleeve being in turn held in a bore of a bracket 51. This bracket is shown as being T-shaped in horizontal section, having a side flange 52 which is secured against the outer face of the corresponding longitudinal side frame bar 16 and having a transverse flange 53 which is secured against the forward face of the front cross bar 21 and projects laterally outwardly from this cross beam as best shown in Fig. 3.

The rear end 45 of each crank arm 41 is shown as journaled in a ball-and-socket bearing indicated generally at 55. For this purpose, as best shown in Fig. 7, a rearwardly opening socket member 56 is shown as welded to the rear end 45 of the crank arm and in this socket is fitted a spherical bearing member 58 of lubricant impregnated material encased in a spherical metal shell 59. An opening is provided through the rear end of each spherical bearing member 58 and its shell 59 and the stem 60 of a ball 61 fitted in the spherical bearing member 58 projects through this opening. This stem 60 can be secured to the frame of the vehicle as by bolting it to a bracket 62 which is in turn suitably secured to the cross bar 22 of the vehicle frame. It will be seen that with the bearings 48 and 55 the crank arm 41 is free to turn about a fulcrum axis which extends lengthwise of the vehicle frame, the ball-and-socket bearing 55 permitting a degree of frame twist without strain upon the parts. It will also be seen that these fulcrum axes for the crank arms 41 at the front end of the vehicle diverge forwardly in a horizontal plane.

The forward end 44 of each crank arm 41 extends through an opening in the transverse flange 53 of the corresponding bracket 51 and connects with a rubber torsion spring secured to this flange and indicated generally at 65. This rubber torsion spring, as best shown in Fig. 7, is preferably constructed as follows:

The numeral 66 represents a generally cylindrical rubber body having a coaxial bore through which the forward end 44 of the corresponding crank arm extends and having inwardly dished conical ends. In these inwardly dished ends of the rubber body are fitted front and rear conical plates 68 and 69, these being vulcanized to the inwardly dished end faces of the rubber body 66 to provide a firm bond therebetween. A disk 70 is suitably secured to the rear conical plate 69 and this disk in turn is secured to the transverse flange 53 of the bracket. A disk 71 is suitably secured to the front conical plate 68, this disk, in turn, being fast to an annular flange 72 of a hub 73 on the forward end 44 of the crank arm 41, this end 44 extending through coaxial apertures provided in the conical plates 68, 69 and disks 70, 71. The hub 73 can be secured to the forward end 44 of the crank arm 41 as by the pin 74 shown and it will be understood that an adjustable connection (not shown) can be provided between any of the parts 44, 73, 71, 68, or between any of the parts 69, 70 or 53 to provide any desired initial tension or wind-up of the rubber body 66.

A square block 76 having an inverted cylindrical socket 78 is welded between each pair of the plates 26 which form spaced extensions of the ends of the axle 25, this block being welded near the upper ends of these plates. A square block 79 is similarly welded between each pair of the plates 26 below the blocks 76 and in vertical alinement therewith. These square blocks 76 and 79 are also shown as connected by a vertical backing plate 77 which also connects the upper edges of the plates 26 and can be welded in place in any suitable manner. This lower block 79 is provided with a vertical threaded bore 80 in axial alinement with the inverted socket 78 of the block 76. A king pin member 81 is journaled in bearings 82 and 83 provided in the inverted socket 78 and threaded bore 80, respectively, and this king pin member is provided with upper and lower pivot pin extensions 84 and 85 journaled in the bearings 82 and 83, and a horizontally outwardly extending arm 86 which carries the conventional king pin 88.

The bearing bushing 89 for the bearing 82 is preferably an inverted cup-shaped bushing of lubricant impregnated material fitted in a cup-shaped metal holder 90 fitted in the inverted socket 78 and the bearing bushing 91 for the bearing 83 is preferably a cup-shaped bushing fitted in a cup-shaped metal holder 92 which is, in turn, fitted in an externally threaded metal bushing 93 screwed into the threaded bore 80 of the lower block 79. The movement of the king pin member 81 is yieldingly restrained in its movement about the axis of the bearings 82, 83 and for this purpose rubber blocks 94 are shown as secured to the opposing faces of each pair of plates 26 and in contact with the front and rear sides of the arm 86 of the king pin member 81.

Each steering wheel 75 is journaled on a steering spindle 95, this steering spindle being pivotally mounted on the upper and lower ends of the king pin 88 in the conventional manner and having an integral steering arm 96 which projects rearwardly therefrom. Each of these steering arms 96 is shown as connected by a horizontal transverse link 98 to the rearwardly projecting arm 99 of a steering mechanism 100. This steering mechanism is shown as mounted centrally on the rear side of the steering axle 25 and can be either mechanical or hydraulic. If a mechanical steering gear is used the steering mechanism 100 can be connected to the steering column through a splined connection (not shown). If a hydraulic steering gear is used the steering mechanism can be connected to the steering column by a hose fitting (not shown).

Each shackle 32 is in the form of a metal link having bores 106 extending through its opposite ends. In each of these bores is arranged a cup-shaped bearing bushing 108 which is preferably made of lubricant impregnated material and is encased in a cup-shaped metal shell 109 which is, in turn, press-fitted in the bore 106. Each of the bearing bushings 108 fits the end of the corresponding pin 31 or 39 and it will be noted that the end faces of these pins are engaged by the bearing bushings 108 so that all thrust forces resulting from brake or drive torque reactions are taken by these bearings. The shackles at each end of the axle are connected together by a tie rod 110, this tie rod having an enlarged central part 111 and reduced threaded ends 112, these threaded ends 112 extending through central openings 113 in the shackles 32, these shackles bearing against the annular shoulders 114 provided by the reduced ends 112. Nuts 115 hold the companion shackles 32 against the shoulders 114. It will also particularly be noted that the shackles 32 slant upwardly and inwardly from the crank arm pivot pins 39 to the axle pivot pins 30.

The rear drive axle 25a is of conventional tubular form to house the axle power shafts 121, connecting the differential within a differential housing 122 with the rear drive wheels 75a, each of which is mounted on a spindle (not shown) at each end of the axle 25a. The rear axle assembly does not have any steering gear or king pin assembly but since in other respects the rear axle assembly is similar to the front axle assembly the same reference numerals have been employed and distinguished by the suffix "a."

Thus, a pair of plates 26a are welded to the front and rear sides of each end of the rear axle 25a to project upwardly therefrom and support a horizontal fore-and-aft tube 30a for the axle pivot pins of a shackle structure indicated at 33a which carry the shackles 32a. These shackles 32a are connected together by a tie rod 110a similar to the tie rods 110 and carry the crank arm pivot pins projecting from the tube 40a which forms the outer end of the tubular crank arm 41a. The forward end of this crank arm is journaled in a ball-and-socket bearing 55a secured to the cross bar 24 and preferably constructed identical to the ball-and-socket bearing 55 at the front end of the chassis; and the rear end is journaled in a bearing 48a of a bracket 51a carried by the rear cross bar 23 and extends through this cross bar to connect with a rubber spring 65a. Each rubber spring 65a has a cylindrical rubber body 66a fast to a rear plate 68a having an annular flange 72a fast to the rear end of the crank arm 41a and is preferably identical with the rubber springs 65a and is mounted on the rear cross bar 23 of the vehicle frame in the same manner and hence this description is not repeated. It will be seen that except for the steering gear and the fact that the axes of the crank arms 41a and tubes 30a and 40a are not in forwardly diverging relation, the suspension at the rear end of the vehicle is substantially similar to the suspension at the front end of the vehicle and hence a detailed description is not repeated.

In the operation of the suspension, the upward movement of one end of the front or steering axle 25, through the shackles 32, swings the outer end of the crank arm 41 upwardly, the fulcrum of this crank arm oscillating about its bearings 48 and 55 which are fast to the chassis frame 15. This rotation of the crank arm is yieldingly resisted by the corresponding rubber torsion spring 65, this movement of the crank arm being transmitted to the forward end of the rubber body 66 through the pin 74, hub 73, flange 72, disk 71 and conical end plate 68, the latter being vulcanized to this rubber body, and the rear end of the rubber body being fast to the chassis frame through the vulcanized conical end plate 69, disk 70 and flange 53 of the bracket 51 secured to the main frame. The front rubber torsion springs 65 thereby provide the yielding support for the front end of the chassis frame 15.

Similarly, the upward movement of the one end of the rear axle housing 25a, through the shackles 32a, swings the outer end of its crank arm 41a upwardly, this crank arm swinging about its bearings 48a and 55a on the chassis frame. This rotation of the crank arm 41a is yieldingly resisted by the rubber torsion springs 65a, the rubber body 66a of each of which is connected at its rear end to the crank arm 41a and at its front end to the chassis frame 15 in the same manner as with the front rubber torsion springs 65. These rubber torsion springs thereby provide the yielding support for the rear end of the chassis frame 15.

It will be noted that the shackles 32, 32a are inclined upwardly and inwardly from the crank arm pivot pins 39, 39a to the axle pivot pins 31, 31a. This upward and inward inclined arrangement of these shackles tends to cause each axle to centralize itself in a direction transverse of the chassis and enables the action of gravity to geometrically and resiliently resist any such movement of the axle away from its central position. This permits the vehicle body to move substantially straight ahead despite a certain amount of lateral movement of the axle. This arrangement of the shackles further provides high and wide pivot positions which provide increased stability in that it provides effective spring centers which can be as wide or wider than the track of the vehicle. Further, this arrangement of the shackles reduces sidesway, the high and wide pivot positioning, together with the upward and inward slant of the shackles, providing a suspension in which the vehicle body is more nearly suspended than mounted. Other important advantages which flow from the inclined arrangement of the shackles are the reduction in the possibility of wheel tramp and in the elimination of the need for anti-body-roll devices, such as torsion bar stabilizers.

When one end of either axle 25, 25a is so forced upwardly relative to the chassis, the effective resilient opposing force of the rubber torsion springs 65, 65a increases at a geometric rate and not at an arithmetic rate. In this particular case the geometric rate is of the accelerated increase type in which increments of vertical movement of the axles are opposed by an accelerated rate of resilient resistance. This is primarily due to the progressive decrease in the effective leverage of the crank arms 41, 41a as they swing upwardly and inwardly about their axes of rotation. This action is also influenced by the varying angularity of the shackles 32, 32a and the fact that increments of vertical displacement of the pivot pins 39, 39a cause accelerated rates of increase in the angular displacement of the rubber torsion springs 65, 65a. This latter is due to the fact that increments of vertical movement of said pivot pins 39, 39a are not proportional to the accompanying increments of angular twist to which their companion rubber torsion springs 65, 65a are subjected.

This geometric action also occurs when either axle moves downwardly relative to the chassis. Throughout this particular movement the geometric action is of the accelerated decrease type, that is, as either axle passes through increments of downward movement the rate of decrease of the resilient force tending to push the axle downwardly decreases.

By this means, so far as vertical forces are concerned, the vehicle chassis is free to "float" along solely under the influence of gravity (plus whatever vertical momentum forces are present), this feature being of particular significance when it is realized that the load carried by the vehicle is also, at this time, solely under the influence of gravity (plus whatever vertical momentum forces are present). The consequence is that, within this particular range of movement, the load in the vehicle moves vertically up and down with the same acceleration and deceleration as the body and hence without changing the pressure between the load and the body. Such a desirable result is quite different from that obtained from the conventional leaf spring suspension in which the axle and the rest of the unsprung weight drags or jerks down the body whenever the strains imposed on the chassis are negative. With the present suspension no such negative force, tending to pull the body downwardly is possible.

Another important advantage obtained by the angular arrangement of the shackles 32, 32a is that it eliminates wheel tramp. This latter may be broadly defined as a periodic vibration of either axle in a vertical transverse plane, the definition being usually limited to a rotary movement about an axis of rotation located at some point in the axle. In general it may be said that if one wheel is lifted and if this movement causes a downward thrust on the opposite wheel, then wheel tramp results. Such wheel tramp is prevented in the present suspension by ensuring that the downward thrust of any axle pivot 31, 31a lies in a plane directed toward the contact of the tire with the road. When such a condition obtains, a vertical upward thrust against one wheel is opposed by a directly opposite force passing through the corresponding axle pivot 31, 31a and hence no downward thrust is imposed upon the opposite wheel as occurs in the conventional leaf spring suspension.

The axles, particularly the front steering axle, are additionally subject to periodic vibrations in a horizontal plane, such vibration being encouraged every time one wheel or the other encounters even a small undulation in the road. Thus, every time the wheel goes over a rising undulation or through a depression in the road, the wheel must speed up and slow down in its rotation because the line of contact between the tire and the road becomes longer than a straight line. This constant change in wheel rotational speed is, of course, transmitted to the axle and if this change in wheel speed is compelled to be instantaneous the vibrations set up in the axle assembly grow to the condition commonly known as wheel shimmy which, in an aggravated condition, renders steering the vehicle impossible. Further, when this change in wheel rotational speed is compelled to be instantaneous the wheel will tend to hop, this not only resulting in further undesirable vibrations escaping to the axle and steering gear, but also causing uneven wear around the periphery of the tire, this being commonly known as tire cupping. The escaping vibrations due to instantaneous change in wheel rotational speed in traveling over an undulating road are further aggravated by the gyroscopic forces inherent in the rotating wheels and lead to pronounced body shake, violent periodic vibration of the axle assembly and uncontrollable steering.

Such instantaneous change in wheel rotational speed can be avoided by permitting the wheels to move in a generally horizontal plane longitudinally of the vehicle, it being also necessary to restrain this freedom of the wheels if the undesirable effects of instantaneous change in wheel speed is to be avoided. With such restrained movement of the wheels longitudinally of the vehicle, the wheels are permitted to yieldingly move lengthwise of the vehicle in response to the changes in speed of the wheel thereby to provide time for the changes in rotational speed of the wheels.

With the present suspension the king pin member or arm 81 is capable of moving about the axis of the pins 84, 85, this movement being restrained and the king pin 88 centered by the opposing rubber pads 94. It will be seen that movement of each steering wheel 75 longitudinally of the chassis is permitted under the resilient restraint of the rubber pads, this providing the necessary time to allow for changes in wheel rotational speed in passing over an undulating road so as to avoid the generation of undue vibrations in the axle and steering gear and uneven wear of the tires. With the steering gear arranged as shown it will be seen that such movement of either steering wheel 75 around the axis of the pins 84, 85 will not change the longitudinal direction of the steering wheel and that the steering is wholly under control of the steering gear. The present invention thereby allows each of the front steering wheels to move longitudinally of the vehicle frame against a resilient resistance of any desired spring rate and without allowing the wheels to change the direction of their travel in relation to the steering gear regardless of the position of the steering gear.

The present invention provides resilient support for the vehicle frame in the form of simple and sturdy rubber torsion springs which can be produced at low cost and are secured both to the frame of the vehicle and also to the crank arms of the suspension in a simple and effective manner and in position where they are readily accessible. Further, the suspension as a whole can be readily designed to have any characteristics within an operative range. Thus, any desired resistance curve can be obtained by making the crank arms 41, 41a of a corresponding length and any desired frequency can be obtained by selecting a rubber spring 65, 65a of such diameter as to provide the angular crank arm movement to provide such desired frequency. The use of the rubber springs 65, 65a of the form shown and in relation to the crank arms 41, 41a, shackles 32, 32a and axle pivots as shown provides this ability to provide any desirable spring rate and resistaance curve in a very simple and inexpensive vehicle suspension.

From the foregoing it will be seen that the present invention provides a very simple and sturdy spring suspension in which any desired operating characteristics can easily be obtained.

I claim:

1. A vehicle spring suspension for connecting the frame structure and axle structure of a vehicle and comprising a pair of spaced coaxial bearings mounted on one of said structures and having their axis arranged lengthwise of said frame structure, a crank arm having longitudinally spaced ends and an offset part normally projecting in a horizontal direction with said ends journaled in said bearings and with one of said ends projecting beyond the corresponding bearing, shackle means pivotally connecting said offset part of said crank arm with the other of said structures, and resilient means to resist rotation of said crank arm comprising a rubber body having a bore extending therethrough and through which said one of said ends of said crank arm extends, means connecting said one of said ends of said crank arm with the side of said rubber body remote from said offset part, and means anchoring the other side of said rubber body on said one of said structures on the side of said corresponding bearing remote from said offset part of said crank arm.

2. A vehicle spring suspension for connecting the frame structure and axle structure of a vehicle and comprising a spherical socket bearing member, a companion bearing member of a ball form fitted in said socket bearing member, one of said bearing members being secured to one of said structures, a sleeve bearing secured to one of said structures in spaced relation, lengthwise of said frame, to one of said bearing members, a crank arm having longitudinally spaced ends and an offset part normally projecting in a horizontal direction, the other of said bearing members being fast to one of said ends of said crank arm and the other end of said crank arm being journaled in and projecting beyond said sleeve bearing, shackle means pivotally connecting said offset part of said crank arm with the other of said structures, and resilient means to resist rotation of said crank arm comprising a rubber body having a bore extending therethrough and through which said projecting end of said crank arm extends, means connecting said projecting end of said crank arm with the side of said rubber body remote from said offset part, and means anchoring the other side of said rubber body on said one of said structures on the side of said sleeve bearing remote from said offset part of said crank arm.

3. A vehicle spring suspension for connecting the frame structure and axle structure of a vehicle and comprising a pair of spaced coaxial bearings mounted on one of said structures and having their axis arranged lengthwise of said frame structure, a crank arm having longitudinally spaced ends and an offset part normally projecting in a horizontal direction with said ends journalled in said bearings and with one of said ends projecting beyond the corresponding bearing, shackle means pivotally connecting said offset part of said crank arm with the other of said structures, and resilient means to resist rotation of said crank arm comprising a rubber body, means connecting said one of said ends of said crank arm with one side of said rubber body, and means anchoring the other side of said rubber body on said one of said structures.

4. A vehicle spring suspension for connecting the frame structure and axle structure of a vehicle and comprising a spherical socket bearing member, a companion bearing member of ball form fitted in said socket bearing member, one of said bearing members being secured to one of said structures, a sleeve bearing secured to one of said structures in spaced relation, lengthwise of said frame, to said one of said bearing members, a crank arm having longitudinally spaced ends and an offset part normally projecting in a horizontal direction, the other of said bearing members being fast to one of said ends of said crank arm and the other end of said crank arm being journalled in and projecting beyond said sleeve bearing, shackle means pivotally connecting said offset part of said crank arm with the other of said structures, and resilient means to resist rotation of said crank arm comprising a rubber body, means connecting said projecting end of said crank arm with one side of said rubber body, and means anchoring the other side of said rubber body on one of said structures.

References Cited in the file of this patent

UNITED STATES PATENTS

| Number | Name | Date |
|---|---|---|
| 1,919,033 | Noble | July 18, 1933 |
| 2,137,848 | Macbeth | Nov. 22, 1938 |
| 2,153,083 | Griswold | Apr. 4, 1939 |
| 2,173,973 | Leighton | Sept. 26, 1939 |
| 2,203,344 | Tjaarda | June 4, 1940 |
| 2,450,506 | Flogaus | Oct. 5, 1948 |